(12) United States Patent
Hayakawa et al.

(10) Patent No.: US 9,424,689 B2
(45) Date of Patent: Aug. 23, 2016

(54) SYSTEM, METHOD, APPARATUS AND COMPUTER READABLE NON-TRANSITORY STORAGE MEDIUM STORING INFORMATION PROCESSING PROGRAM FOR PROVIDING AN AUGMENTED REALITY TECHNIQUE

(71) Applicant: NINTENDO CO., LTD., Kyoto (JP)

(72) Inventors: Takeshi Hayakawa, Kyoto (JP); Tatsuro Ota, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 326 days.

(21) Appl. No.: 14/105,450

(22) Filed: Dec. 13, 2013

(65) Prior Publication Data
US 2014/0253591 A1 Sep. 11, 2014

(30) Foreign Application Priority Data
Mar. 5, 2013 (JP) .................................. 2013-043161

(51) Int. Cl.
*G06T 19/00* (2011.01)
(52) U.S. Cl.
CPC .................................. *G06T 19/006* (2013.01)
(58) Field of Classification Search
None
See application file for complete search history.

(56) References Cited

U.S. PATENT DOCUMENTS

| | | | | |
|---|---|---|---|---|
| 2007/0211047 | A1* | 9/2007 | Doan | ........................ A63F 1/04 345/419 |
| 2011/0105220 | A1* | 5/2011 | Hill | ........................ A63F 13/12 463/29 |
| 2012/0218298 | A1* | 8/2012 | Hayakawa | .............. A63F 13/10 345/633 |
| 2012/0268493 | A1* | 10/2012 | Hayakawa | .............. A63F 13/06 345/633 |
| 2013/0100165 | A1* | 4/2013 | Komiyama | ............ G09G 5/397 345/634 |

FOREIGN PATENT DOCUMENTS

JP 2000-322602 11/2000

* cited by examiner

*Primary Examiner* — Michael J Cobb
(74) *Attorney, Agent, or Firm* — Nixon & Vanderhye P.C.

(57) ABSTRACT

An augmented reality technique is implemented by, for example, an information processing apparatus which is configured to function and operate as an image acquiring unit that acquires an image of a real space captured by an imaging device, a feature detection unit that detects one or more features from the captured image, an image generating unit that generates an image of a virtual space and places a virtual object made to correspond to the detected feature at a position in the virtual space based on the position of the detected feature in the acquired real space image, and a display control unit that causes an image to be displayed on a display device such that a user sees the virtual space image superimposed upon the acquired real space image. In one example operation implementation, when a first feature and a second feature are detected together in a captured real space image, the image generating unit determines a first virtual object corresponding to a combination of the first feature and the second feature and places the first virtual object at a position in the virtual space based on a position of the second feature in the acquired real space image.

21 Claims, 5 Drawing Sheets

SYSTEM, METHOD, APPARATUS AND COMPUTER READABLE NON-TRANSITORY STORAGE MEDIUM STORING INFORMATION PROCESSING PROGRAM FOR PROVIDING AN AUGMENTED REALITY TECHNIQUE

This application is based upon and claims the benefit of priority of the prior Japanese Patent Application No. JP 2013-043161, filed on Mar. 5, 2013, the entire contents of which are incorporated herein by reference.

FIELD

The present disclosure relates to an information processing system, an information processing apparatus, an information processing method, and a computer-readable recording medium having an information processing program recorded therein for superimposing various kinds of information over a real space.

BACKGROUND AND SUMMARY

Augmented Reality or AR is a technology to present various kinds of information by superimposing them over a real space so as to augment the real world. One AR technique is use of a two-dimensional barcode printed on a card, for example. With this technique, a two-dimensional barcode is identified in a captured image from a camera and three-dimensional image data made to correspond to the two-dimensional barcode is displayed on a display device by superimposition at the position of the two-dimensional barcode.

This augmented reality technique, however, lacks variety as visual effects since three-dimensional image data corresponding to a two-dimensional barcode is merely displayed at the position of the two-dimensional barcode on a screen of a display device on which a captured image is displayed.

The present disclosure is an information processing system including a first feature, a second feature different from the first feature, and an information processing apparatus. The information processing apparatus includes: an image acquiring unit that acquires an image of a real space captured by an imaging device; a feature detection unit that detects one or more features from the real space image captured by the image acquiring unit; an image generating unit that generates an image of a virtual space, by placing a virtual object made to correspond to the detected feature at a position based on the position of the feature in the virtual space; and a display control unit that causes an image to be displayed on a display device such that a user sees the virtual space image superimposed on a real space, wherein when the first feature and the second feature are detected in a real space image acquired by the image acquiring unit, the image generating unit places a first virtual object corresponding to the first feature in the virtual space at a position based on the position of the second feature.

The display device may be connected as a peripheral to the information processing apparatus according to the present disclosure or connected over a communications network or the like. Also, the information processing apparatus according to the present disclosure may be constructed in a virtual environment, such as so-called cloud.

A feature placed in a real space may be a marker for so-called AR or a code such as a two-dimensional barcode, for example. Such a feature may be come together with a component such as a card, for example. Such a feature is not limited to a dedicated marker or code. Any article used for other purpose may be used as a feature as long as a display reference for a virtual object can be acquired from it.

According to the present disclosure, since a first virtual object to be displayed at a position based on the second feature is determined depending on a first feature that is detected with the second feature, an augmented reality technique that achieves visual variations can be provided.

The type of augmented reality technique to which the present disclosure is applied is not limited. For example, the present disclosure is applicable to an augmented reality technique of a type that displays a composite image combining a captured image with a virtual space image so that the user can see the virtual space image superimposed on the real space, or a type that projects a virtual space image in the user's field of view so that the user can see the virtual space image superimposed on the real space (e.g., a head-up display or HUD and the like).

When the first feature is detected with the second feature by the feature detection unit in a real space image acquired by the image acquiring unit, the image generating unit may place the first virtual object and a virtual object made to correspond to the second feature in the virtual space at a position based on the position of the second feature.

The first feature may be of a plurality of types, and the image generating unit of the information processing apparatus may decide the first virtual object to be placed at a position based on the position of the second feature according to the type of the first feature that is detected with the second feature.

When the type of the first feature detected with the second feature by the feature detection unit has been updated, the image generating unit of the information processing apparatus may update the first virtual object to be placed at a position based on the position of the second feature to a first virtual object that corresponds to the type of the first feature after the update.

When the type of the first feature detected with the second feature by the feature detection unit has been updated, the image generating unit of the information processing apparatus may also place a first virtual object that corresponds to the type of the first feature after the update in addition to the first virtual object that has been displayed since before the update at a position based on the position of the second feature.

When a plurality of first features and the second feature are detected by the feature detection unit in a real space image acquired by the image acquiring unit, the image generating unit of the information processing apparatus may place first virtual objects respectively corresponding to the plurality of first features at a position based on the position of the second feature, and place virtual objects made to respectively correspond to the plurality of first features at positions that are based on the positions of the plurality of first features in the virtual space.

When a plurality of first features including features of different types and the second feature are detected by the feature detection unit in a real space image acquired by the image acquiring unit, the image generating unit of the information processing apparatus may place at least one of first virtual objects corresponding to the respective types of the plurality of first features in the virtual space at a position based on the position of the second feature, and place virtual objects made to respectively correspond to the types of the plurality of first features at positions that are based on the positions of the first features.

When a plurality of first features and the second feature are detected by the feature detection unit in a captured image, the image generating unit of the information processing apparatus may place a first virtual object that corresponds to the type of a first feature that satisfies a predetermined condition in the virtual space at a position based on the position of the second feature, and place virtual objects made to respectively correspond to the types of the plurality of first features at positions that are based on the positions of the first features.

The image generating unit of the information processing apparatus may place a first virtual object that corresponds to the type of a first feature that is in a predetermined positional relationship with the second feature as the predetermined condition at a position based on the position of the second feature.

The image generating unit of the information processing apparatus may place a first virtual object corresponding to the type of a first feature that has the highest priority, the priority being assigned to respective types of the first feature, among the first features detected by the feature detection unit as the predetermined condition at a position based on the position of the second feature.

When a plurality of first features of different types and the second feature are detected by the feature detection unit in a real space image acquired by the image acquiring unit, the image generating unit of the information processing apparatus may place a first virtual object that corresponds to a combination of the types of the plurality of first features in the virtual space at a position based on the position of the second feature, and place virtual objects made to respectively correspond to the types of the plurality of first features at respective positions that are based on the positions of the first features.

When a plurality of first features of different types and the second feature are detected by the feature detection unit in a real space image, the image generating unit of the information processing apparatus may place a first virtual object that corresponds to an order in which the first features are added with respect to the second feature in the virtual space at a position based on the position of the second feature, and place virtual objects made to respectively correspond to the types of the plurality of first features at respective positions that are based on the positions of the first features.

When a plurality of first features of different types and the second feature are detected by the feature detection unit in a real space image, the image generating unit of the information processing apparatus may place a first virtual object that corresponds to positional relationships of the first features with the second feature in the virtual space at a position based on the position of the second feature, and place virtual objects made to respectively correspond to the types of the plurality of first features at respective positions that are based on the positions of the first features.

When the second feature is detected but the first feature has ceased to be detected by the feature detection unit while a virtual space image is being generated with the first virtual object corresponding to the first feature placed at a position based on the position of the second feature in response to detection of the first feature and the second feature in a real space image acquired by the image acquiring unit, the image generating unit may continue to generate the virtual space image by placing the first virtual object corresponding to the first feature in the virtual space at a position based on the position of the second feature. In this case, if a predetermined condition is satisfied, the image generating unit may generate the virtual space image without placing the first virtual object that has been placed at a position based on the second feature even after the first feature ceased to be detected, at the position based on the second feature. The predetermined condition may be that a predetermined time period elapses since the first feature ceased to be detected, for example.

When the second feature is detected and the first feature is not detected in a real space image by the feature detection unit, the image generating unit may generate the virtual space image by placing a virtual object made to correspond to the second feature in the virtual space at a position based on the position of the second feature.

The image generating unit may place a virtual object made to correspond to the first feature at a position based on the position of the first feature. A virtual object made to correspond to the first feature may be different from the first virtual object which is placed at a position based on the position of the second feature in accordance with the first feature.

The first feature may be graphics representing at least part of a figure of the virtual object made to correspond to the first feature, and the second feature may not be graphics representing the figure of the virtual object made to correspond to the second feature. The second feature thus is not bound by the model of the virtual object made to correspond to the second feature; it may be used for applications other than a game in which a certain character on which the virtual object made to correspond to the second feature is modeled appears, for example.

The first feature may be printed on an information holding device that holds information that enables a user to acquire a predetermined content and remains in the user's possession after the user acquired the predetermined content, and the second feature may be printed on packaging of the information holding device. This enables the information holding device to be reused even after the user acquires the predetermined content and gives a new value to the information holding device.

The present disclosure can also be construed as an information processing apparatus, an information processing system having one or more information processing apparatuses, a computer-implemented method, or a program for execution by a computer. The present disclosure may also be practiced as such a program recorded in a recording medium readable by a computer, other devices or machines or the like. A recording medium readable by a computer or the like refers to a recording medium that stores information such as data and programs by electrical, magnetic, optic, mechanical, or chemical action, and that allows the information to be read by a computer or the like.

DETAILED DESCRIPTION OF NON-LIMITING EXAMPLE EMBODIMENTS

An embodiment of the present disclosure will be described with reference to the drawings. The embodiment described below illustrates an example of practicing the present disclosure and is not intended to limit the present disclosure to the specific configurations described below.

For practicing the present disclosure, a specific configuration may be adopted as appropriate for each embodiment. For example, the present disclosure may be applied to an information processing program for execution on a computer of a portable information processing apparatus, an information processing apparatus, an information processing system having one or more information processing apparatuses, an information processing method and the like.

In view of the drawback outlined above, an object of the present disclosure is to provide an augmented reality technique rich in visual variations.

System Configuration

Figure 1:
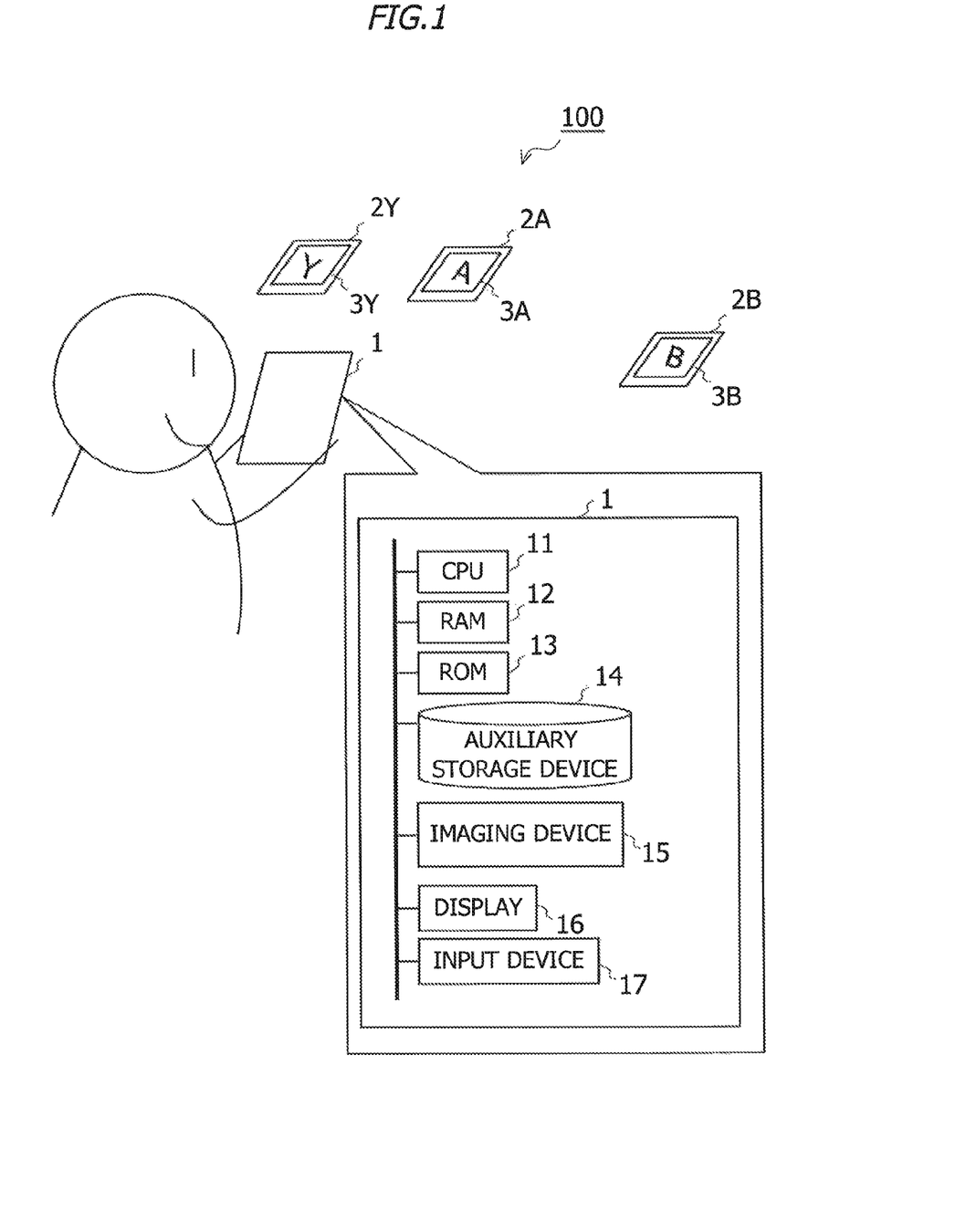
FIG. 1 shows an example non-limiting system configuration according to an embodiment.

FIG. 1 illustrates a configuration of a system 100 according to an embodiment of the present disclosure. The system 100 includes an information processing apparatus 1, and multiple cards 2A, 2B, and 2Y (which may be referred to just as "card 2" when card types are not distinguished).

The information processing apparatus 1 may be a handheld game console, a smart phone, a portable telephone terminal, a tablet terminal or the like, for example. The information processing apparatus 1 is an information processing apparatus configured by a CPU (Central Processing Unit) 11 being electrically connected with a RAM (Random Access Memory) 12, a ROM (Read Only Memory) 13, an auxiliary storage device 14, an imaging device 15, a display (display device) 16, and an input device 17 such as various buttons or a touch panel. The specific hardware configuration of the information processing apparatus 1 permits omission, substitution, or addition of components as appropriate for each embodiment. For example, in a case where the information processing apparatus 1 is a stationary game console, the imaging device 15, display 16, input device 17 and the like are independent devices and connected to the information processing apparatus 1 as peripherals.

The CPU 11, which is a central processing unit, controls components included in the information processing apparatus 1, such as the RAM 12 and the auxiliary storage device 14, by processing instructions and data loaded into the RAM 12, the ROM 13 and the like. The RAM 12 serves as a main storage, which is controlled by the CPU 11 and to and from which instructions and data are written and read. That is, the CPU 11, the RAM 12, and the ROM 13 constitute a control unit of the information processing apparatus 1.

The auxiliary storage device 14 is a non-volatile storage device, to and from which mainly information that is to be maintained even after the information processing apparatus 1 is powered off, e.g., an OS (Operating System) of the information processing apparatus 1 to be loaded to the RAM 12, various programs for executing processing described below, various pieces of data for use by the information processing apparatus 1 and the like, are written and read out. The auxiliary storage device 14 may be an EEPROM (Electrically Erasable Programmable ROM), an HDD (Hard Disk Drive) and the like, for example. Alternatively, the auxiliary storage device 14 may be a portable medium that can be removably attached to the information processing apparatus 1. Examples of portable media include a memory card using EEPROM or the like, a CD (Compact Disc), a DVD (Digital Versatile Disc), and a BD (Blu-ray Disc). It is also possible to use an auxiliary storage device 14 in the form of a portable medium and an auxiliary storage device 14 in the form of a non-portable medium in combination.

On the cards 2A, 2B, and 2Y, different markers 3A, 3B, and 3Y (referred to as just "marker 3" when marker types are not differentiated) are indicated such as by printing. The marker 3 is made to correspond to a virtual object to be displayed by the information processing apparatus 1 and serves as an indicator of reference position and posture when the virtual object made to correspond to the marker 3 is to be displayed. While FIG. 1 illustrates three cards 2, one, or two or more cards 2 may be used.

The markers 3A, 3B are each made to correspond to a virtual object that represents a certain character, for example, by the information processing apparatus 1. The markers 3A, 3B are graphics that represent at least part of the figures of the corresponding virtual objects respectively, for example. More specifically, the markers 3A, 3B may be the faces of characters on which the corresponding virtual objects are modeled, for example. In the drawings however the markers 3A, 3B are represented by letters for the sake of convenience. The cards 2A, 2B on which the markers 3A, 3B are printed may be paper cards, information holding devices for holding information enabling the user to acquire a predetermined content, or the like, for example. The information holding device may be a prepaid card and the like, for example, and the predetermined content may be a game application, and the information enabling the user to acquire the content may be points, a serial code or the like. The information holding device will remain in the user's possession after the user acquires the predetermined content.

The marker 3Y is made to correspond to a different virtual object by the information processing apparatus 1 depending on combinations with the other markers 3, for example. The marker 3Y is different from the markers 3A, 3B and is graphics that is not related to the figure of the corresponding virtual object, for example. For example, a virtual object (YA) is made to correspond to the combination of the markers 3Y and 3A, while a virtual object (YB) is made to correspond to the combination of the markers 3Y and 3B. The marker 3Y may be printed on a paper card or the packaging of the information holding device on which the marker 3A and marker 3B are printed, for example. The packaging of the information holding device is a mount sheet for a prepaid card, for example.

Hereinafter, the marker 3Y may be called a common marker 3Y. The markers 3A, 3B will be referred to as individual markers 3A, 3B (as individual markers 3, when they are not distinguished). The individual marker 3 is an example of a "first feature". The common marker 3Y is an example of a "second feature".

In this embodiment, a virtual object is superposed and displayed at a predetermined position relative to the corresponding marker 3 on the display 16 of the information processing apparatus 1. The virtual object also has top and bottom, front and rear, and left and right directions. Accordingly, the marker 3 is preferably capable of determining the display posture of the virtual object. More specifically, the marker 3 is preferably a symbol, a letter, a figure, a picture, or a combination thereof that can determine the position and posture relative to the imaging device 15 by being imaged by the imaging device 15.

Next, functions of the information processing apparatus 1 according to this embodiment will be described. The information processing apparatus 1 according to this embodiment is an information processing apparatus having a so-called AR function. The information processing apparatus 1 has the ability to superpose a virtual object in a virtual space drawn (rendered) using a virtual camera over a captured image of a real space captured by the imaging device 15 and display the resulting image on the display 16. In this embodiment, a virtual object is three-dimensional image data. The virtual object may instead be two-dimensional image data, however.

Figure 2:
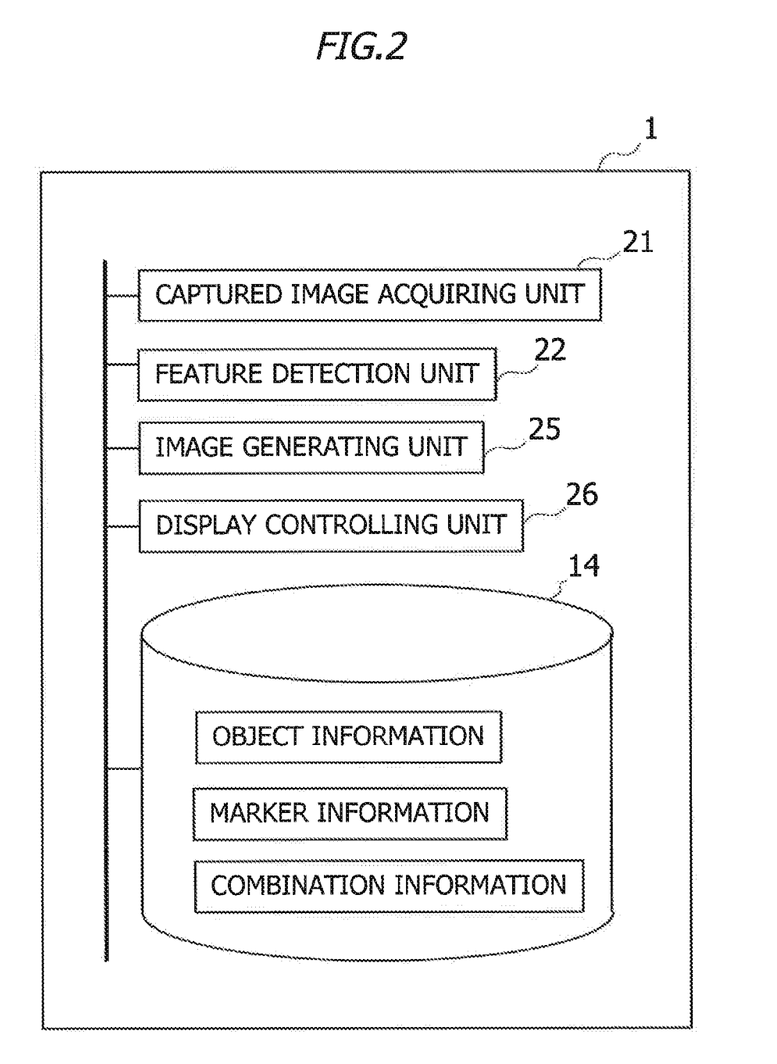
FIG. 2 shows an example non-limiting functional configuration of an information processing apparatus according to an embodiment.

FIG. 2 schematically illustrates the functional configuration of the information processing apparatus 1 according to this embodiment. The information processing apparatus 1 according to this embodiment functions as an information processing apparatus that includes a captured image acquiring unit 21, a feature detection unit 22, an image generating unit 25, and a display control unit 26, by the CPU 11 interpreting and executing various programs loaded in the RAM 12. While this embodiment describes a case where these functions are all carried out by a general-purpose CPU 11, some or all of the functions may be realized by one or more special-purpose processors.

The captured image acquiring unit 21 acquires an image captured by the imaging device 15. The feature detection unit 22 performs image processing, e.g., pattern matching and the like, on the image captured by the imaging device 15 to detect markers 3 contained in the image. Detection of markers 3 may use an image recognition engine, for example. The feature detection unit 22 is also capable of detecting position information of the markers 3 when detecting the markers 3 included in the captured image. Position information of the marker 3 is the coordinates of the marker 3 within the screen of the display 16 and the like, for example.

The image generating unit 25 draws or renders a virtual space image by placing virtual objects corresponding to markers 3 in a virtual space at positions based on the positions of the markers 3 detected by the feature detection unit 22 and generating a virtual space image as seen from a virtual camera. The virtual object is placed at a position based on the position of the marker 3 in a posture corresponding to the posture of the marker 3 in the coordinate system of the marker 3 within the virtual space. The coordinate system and posture of a marker 3 is calculated by the image generating unit 25. For example, the marker coordinate system of the marker 3 is constituted by three axes that are orthogonal to each other with the center point of the marker 3 being the origin point. By defining a virtual space coordinate system with reference to a marker 3 positioned in a real space, the real space can be mapped to a virtual space. Mapping between a real space and a virtual space may use a scheme other than one using a marker coordinate system. For calculation of the coordinate system and posture of a marker, any of known methods may be employed.

The image generating unit 25 acquires information on the virtual object made to correspond to each marker 3 from object information, which is discussed later. When multiple markers including the common marker 3Y are detected, the image generating unit 25 acquires information on a virtual object to be placed over the common marker 3Y from combination information, which is described below. The virtual object to be placed over the common marker 3Y in such a case varies depending on which individual marker 3 is combined with the common marker 3Y.

The display control unit 26 causes the display 16, which is a display device, to display a composite image generated by superimposing a virtual space image including virtual objects generated by the image generating unit 25 on a captured image acquired by the captured image acquiring unit 21. This gives the user a sense as if the virtual object was really present in the real space.

Next, information maintained by the information processing apparatus 1 according to this embodiment will be described. The information processing apparatus 1 maintains marker information, object information, and combination information in the auxiliary storage device 14.

The marker information is information regarding markers 3. The marker information includes a marker ID for identifying a marker 3, a marker image, a marker size, a corresponding object ID, position/posture of a virtual object, display size for the virtual object and the like, for example. The marker image is an image representing the outer appearance of the marker 3. The marker size is information indicating the dimensions of the marker 3, such as vertical and horizontal lengths of the marker 3. The image generating unit 25 can acquire the marker coordinate system from how a marker 3 included in a captured image appears, based on the marker image and marker size. The corresponding object ID is an identification number of a virtual object to be displayed at a position corresponding to the marker 3. Note that two or more virtual objects may be made to correspond to one marker 3. Marker information is present for each marker 3 used in the system 100. Marker information also includes information on a common marker 3Y.

Object information is information regarding a virtual object to be displayed at a position corresponding to the marker 3. Object information includes an object ID for identifying the virtual object and data on the object, for example. Object information is present for each object used in the system 100.

Combination information indicates correspondence between combinations of the common marker 3Y with individual markers 3 and the object IDs of virtual objects that are displayed at the position corresponding to the common marker 3Y. More specifically, combination information includes marker IDs of individual markers 3 that are combined with the common marker 3Y, corresponding object IDs, position and posture of virtual objects, display size of the objects, and so forth. The combinations may include a combination of the common marker 3Y and one individual marker 3, and a combination of the common marker 3Y and multiple different individual markers 3. Two or more virtual objects may be made to correspond to one combination.

Processing Flow

Next, the flow of processing executed in this embodiment is described. Note that specific contents and processing order in the processing illustrated in the flowchart according to this embodiment are an example for practicing the present disclosure; specific processing contents and processing order may be selected as appropriate for each embodiment of the present disclosure.

Figure 3:
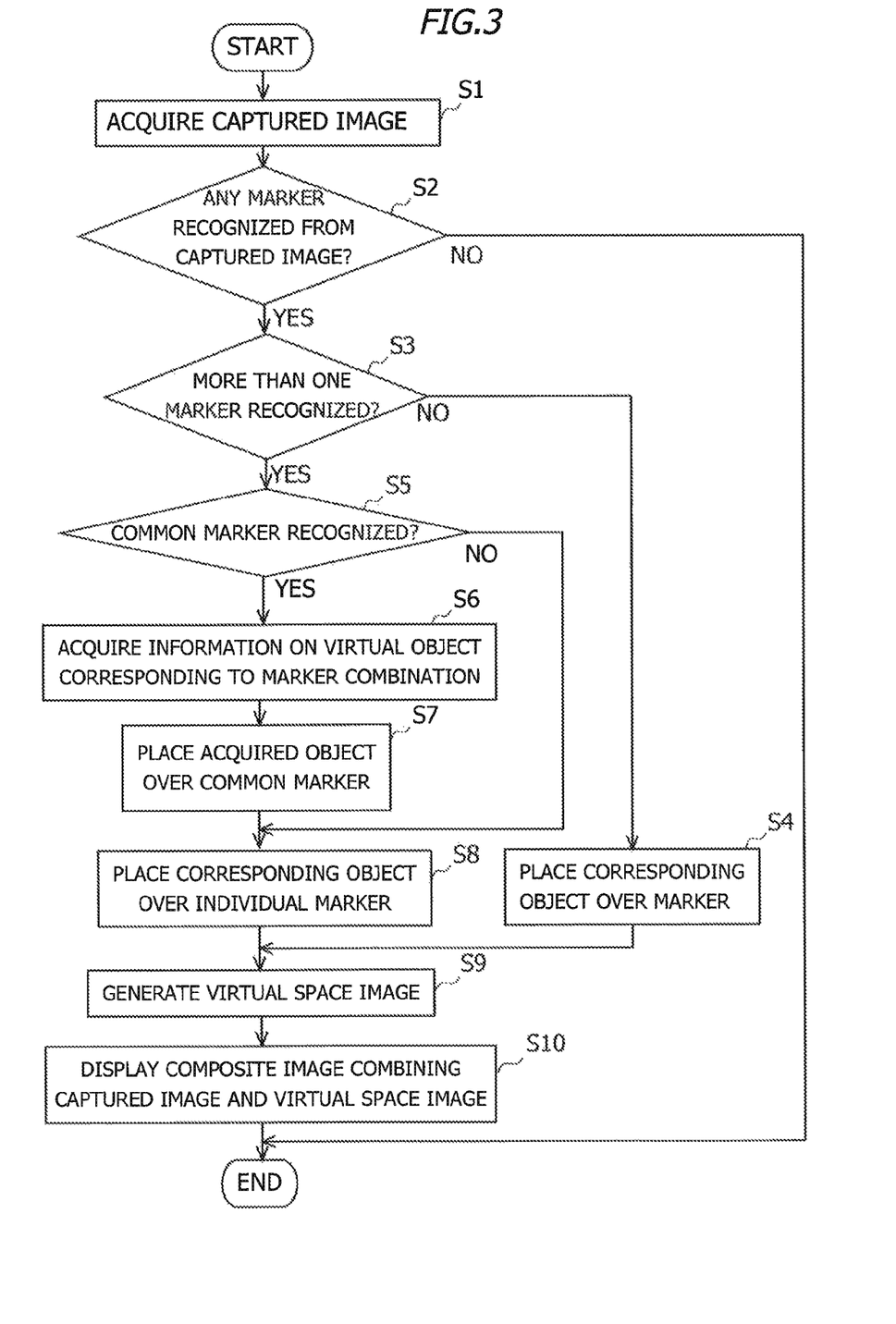
FIG. 3 shows an example non-limiting flowchart illustrating the flow of information processing according to an embodiment.

FIG. 3 is an exemplary flowchart illustrating the flow of information processing according to this embodiment. The flowchart illustrated in FIG. 3 starts in response to a user operation for activating an AR function being accepted on the information processing apparatus 1. Also, the flowchart illustrated in FIG. 3 is repeatedly executed per frame at the rate of 60 frames/second, which is the interval at which a captured image is acquired from the imaging device 15, for example.

At step S1, the captured image acquiring unit 21 acquires a captured image taken by the imaging device 15. At step S2, the feature detection unit 22 detects any marker 3 representing marker images included in marker information from the captured image as features in the space captured in the image. If any marker is detected (S2: YES), the flow proceeds to step S3. Detection of a marker 3 may use a general image recognition engine. If no marker is detected (S2: NO), the process illustrated in FIG. 3 then ends.

At step S3, if multiple markers 3 are detected by the feature detection unit 22 (S3: YES), the flow proceeds to step S5. If one marker 3 is detected by the feature detection unit 22 (S3: NO), the flow proceeds to step S4.

At step S4, the image generating unit 25 places a virtual object corresponding to the detected marker 3 at the position corresponding to the marker 3 in a virtual space. The virtual object ID corresponding to the marker 3 and a display position for the virtual object are acquired from marker information. The virtual object is acquired from object information according to the object ID acquired from marker information. The flow also branches to step S4 when the one marker detected at S2 is a common marker 3Y, where a virtual object corresponding to the common marker 3Y is placed at the position corresponding to the common marker 3Y.

At step S5, the feature detection unit 22 determines whether the detected multiple markers 3 include a common marker 3Y. If the common marker 3Y is included (S5: YES), the flow proceeds to step S6. If the common marker 3Y is not included (S5: NO), the flow proceeds to step S8.

At step S6, the image generating unit 25 acquires the object ID of the virtual object corresponding to the combination of the common marker 3Y and the individual marker 3 that have been detected from combination information. The flow then proceeds to step S7.

At step S7, the image generating unit 25 places the virtual object having the object ID acquired at step S6 at the position corresponding to the common marker 3Y in the virtual space. The flow then proceeds to step S8.

At step S8, the image generating unit 25 places the virtual object corresponding to the individual marker 3 at the position corresponding to the marker 3 in the virtual space. The flow then proceeds to step S9.

At step S9, the image generating unit 25 generates a virtual space image. The image generating unit 25 draws a virtual space image including one or more virtual objects placed in a marker coordinate system from the viewpoint of a virtual camera located at the same position as the imaging device 15 in the marker coordinate system. Object data for drawing a virtual object is acquired from object information. A virtual object may be animated by causing it to change every one or several frames. The animation may be change in the facial expression or motion of the character represented by the virtual object, for example. The flow then proceeds to step S10.

At step S10, the display control unit 26 generates a composite image by superimposing the virtual space image on the captured image and outputs the composite image to the display 16 to display thereon.

Figure 4:
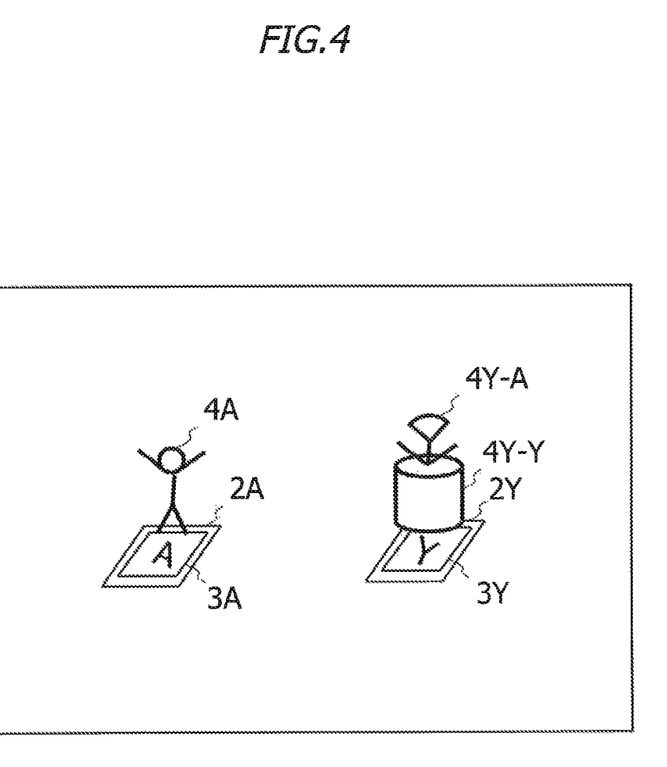
FIG. 4 shows an example non-limiting display screen for when a common marker and one individual marker are detected in an embodiment.
Figure 5:
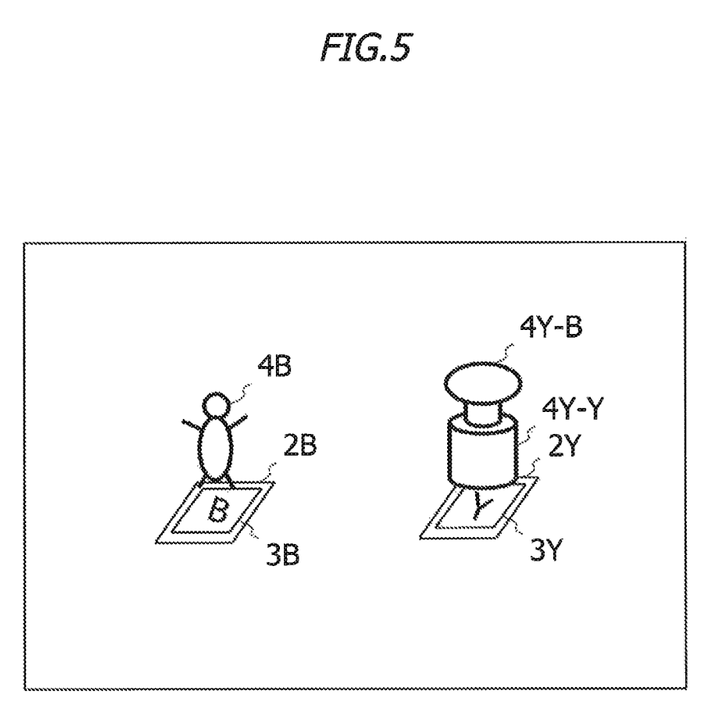
FIG. 5 shows an example non-limiting display screen for when a common marker and one individual marker are detected in an embodiment.

FIGS. 4 and 5 illustrate example display screens of the display 16 for a case where an AR function is provided though information processing according to this embodiment.

FIG. 4 is an example screen of the display 16 for when the common marker 3Y and an individual marker 3A are detected. In the example illustrated in FIG. 4, a virtual object 4A is displayed at the position corresponding to the individual marker 3A, and virtual object 4Y-Y and a virtual object 4Y-A are displayed at the position corresponding to the common marker 3Y.

In the case of an example illustrated in the FIG. 4, the virtual object 4A is made to correspond to the individual marker 3A in marker information. In combination information, virtual objects 4Y-Y and 4Y-A are made to correspond to the combination of the common marker 3Y and the individual marker 3A. The image generating unit 25 places the virtual object 4A at the position corresponding to the individual marker 3A and the virtual objects 4Y-Y and 4Y-A at the position corresponding to the common marker 3Y in accordance with such marker information and combination information (S6 to S8 in FIG. 3).

FIG. 5 illustrates an example screen of the display 16 for a case where the common marker 3Y and the individual marker 3B are detected. In the example illustrated in FIG. 5, a virtual object 4B is displayed at the position corresponding to the individual marker 3B. At the position corresponding to the common marker 3Y, the virtual object 4Y-Y and the virtual object 4Y-B are displayed.

In the case of an example illustrated in FIG. 5, the virtual object 4B is made to correspond to the individual marker 3B in marker information. In combination information, virtual objects 4Y-Y and 4Y-B are made to correspond to the combination of the common marker 3Y and the individual marker 3B. The image generating unit 25 places the virtual object 4B at the position corresponding to the individual marker 3B, and virtual objects 4Y-Y and 4Y-B at the position corresponding to the common marker 3Y in accordance with such marker information and combination information (S6 to S8 in FIG. 3).

As illustrated in FIGS. 4 and 5, the information processing apparatus 1 decides the virtual object to be displayed at the position corresponding to the common marker 3Y in accordance with the type of the individual marker 3 that is detected with the common marker 3Y. That is, the virtual object displayed at the position corresponding to the common marker 3Y varies depending on which individual marker 3 is combined with one common marker 3Y. This enables provision of an AR function rich in visual variation.

When only the common marker 3Y is detected in a captured image by the feature detection unit 22, the image generating unit 25 places the virtual object made to correspond to the common marker 3Y in marker information (e.g., virtual object 4Y-Y) at the position corresponding to the common marker 3Y.

For example, if either the individual marker 3A or the individual marker 3B subsequently comes outside the imaging range in the examples illustrated in FIGS. 4 and 5, the image generating unit 25 may continue to generate a virtual space image by placing a virtual object formed of the combination of the virtual objects 4Y-Y and 4Y-A or a virtual object formed of the combination of virtual objects 4Y-Y and 4Y-B at the position corresponding to the common marker 3Y. When a predetermined time period has elapsed after the individual marker 3A or the individual marker 3B became no longer detected, when another individual marker 3 is detected, or the like, for example, the image generating unit 25 may stop placing a virtual object formed of the combination of the virtual objects 4Y-Y and 4Y-A or a virtual object formed of the combination of virtual objects 4Y-Y and 4Y-B at the position corresponding to the common marker 3Y.

Also, in the examples illustrated in FIGS. 4 and 5, only the virtual object 4Y-A or only the virtual object 4Y-B may be made to correspond to the combination of the common marker 3Y and the individual marker 3A or the individual marker 3B, respectively, in combination information. In this case, the image generating unit 25 places only the virtual object 4Y-A or only the virtual object 4Y-B at the position corresponding to the common marker 3Y based on combination information.

In the above-described embodiment, when the individual marker 3 detected with the common marker 3Y is updated to a different type of individual marker 3, the virtual object displayed at the position corresponding to the common marker 3Y is updated to the virtual object that is made to correspond to the combination of the newly detected individual marker 3 and the common marker 3Y. This is not limitative however; the virtual object that has been displayed at the position corresponding to the common marker 3Y since before the update may be maintained even after the individual marker 3 detected with the common marker 3Y is updated to a different type of individual marker 3, and a virtual object made to correspond to the combination of the newly detected individual marker 3 and the common marker 3Y may be additionally displayed. In this case, the multiple virtual objects that have been displayed at the position corresponding to the common marker 3Y may be reset by bringing the individual markers 3 outside the imaging range and detecting only the common marker 3Y continuously for a predetermined time period, for example.

When the common marker 3Y and multiple individual markers 3 are detected, the image generating unit 25 may place all virtual objects that are made to correspond to the respective combinations of the common marker 3Y and the multiple individual markers 3 in combination information at the position corresponding to the common marker 3Y at S7 in FIG. 3. In this case, the image generating unit 25 adjusts placement so that the virtual objects do not overlap each other, for example. For example, if the feature detection unit 22 detects the common marker 3Y, the individual marker 3A, and the individual marker 3B, the image generating unit 25 may place a virtual object that combines virtual objects 4Y-Y and 4A and a virtual object that combines virtual objects 4Y-Y and 4B at the position corresponding to the common marker 3Y (S7 in FIG. 3). As an alternative, the image generating unit 25 may place the virtual objects 4Y-Y, 4A, and 4B separately at positions based on the position of the common marker 3Y, for example.

Alternatively, when the common marker 3Y and multiple individual markers 3 are detected, the information processing apparatus 1 may select an individual marker 3 that satisfies a predetermined condition with respect to the common marker 3Y and display the virtual object made to correspond to the combination with the selected individual marker 3 at the position corresponding to the common marker 3Y. In this case, the image generating unit 25 selects an individual marker 3 that satisfies a predetermined condition with respect to the common marker 3Y and acquires information on the virtual object that is made to correspond to the combination of the common marker 3Y and that individual marker 3 from combination information in the processing at S6 in FIG. 3, for example.

The predetermined condition may be the positional relationship of an individual marker 3 relative to the common marker 3Y, for instance. More specifically, the predetermined condition may be that the individual marker 3 is nearest to the common marker 3Y, where the image generating unit 25 may select the individual marker 3 that is positioned nearest to the common marker 3Y and place the virtual object corresponding to the combination with that individual marker 3 at the position corresponding to the common marker 3Y. The predetermined condition may also be that an individual marker 3 is positioned within a predetermined distance from the common marker 3Y, that an individual marker 3 points to the common marker 3Y, or that an individual marker 3 points in the opposite direction to the common marker 3Y. The positional relationship of a marker 3 is determined by the image generating unit 25 from position information of the marker 3 that is detected by the feature detection unit 22 when the marker 3 is detected.

The predetermined condition may also be order of priority, for example. Priorities may be assigned to combinations of the common marker 3Y and respective individual markers 3 in combination information, and when the feature detection unit 22 detects the common marker 3Y and multiple individual markers 3, the image generating unit 25 may select the virtual object that is made to correspond to the combination of the common marker 3Y and an individual marker 3 having the highest priority among the detected combinations from combination information and place the selected virtual object at the position corresponding to the common marker 3Y.

It is also possible to make a virtual object correspond to a combination of the common marker 3Y and multiple individual markers 3 in combination information. When such correspondence is achieved, if the feature detection unit 22 detects the common marker 3Y and multiple individual markers 3, the image generating unit 25 places the virtual object made to correspond to the combination of the common marker 3Y and the multiple individual markers 3 in combination information at the position corresponding to the common marker 3Y.

By way of example, a virtual object (Y) is made to correspond to the combination of the common marker 3Y, the individual marker 3A, and the individual marker 3B in combination information. When the feature detection unit 22 detects the common marker 3Y, the individual marker 3A, and the individual marker 3B, the image generating unit 25 places the virtual object (Y) at the position corresponding to the common marker 3Y based on the combination information (S6 and S7 in FIG. 3).

In a case where a virtual object is made to correspond to a combination of the common marker 3Y and multiple individual markers 3 in combination information, virtual objects may be set in accordance with the order in which the individual markers 3 are added.

By way of example, in combination information, a virtual object (A) is made to correspond to the combination of the common marker 3Y and the individual marker 3A as a first step, and a virtual object (X) is made to correspond to the combination of the common marker 3Y, the individual marker 3A, and the individual marker 3B as a second step corresponding to the first step. Further, in combination information, a virtual object (B) is made to correspond to the combination of the common marker 3Y and the individual marker 3B as a first step, and a virtual object (Y) is made to correspond to the combination of the common marker 3Y, the individual marker 3B, and the individual marker 3A as the second step corresponding to the first step.

When the feature detection unit 22 detects the common marker 3Y and the individual marker 3A, the image generating unit 25 places the virtual object (A) at the position corresponding to the common marker 3Y based on the first-step combination in combination information. If the individual marker 3B is then added and the feature detection unit 22 detects the common marker 3Y, the individual marker 3A, and the individual marker 3B, the image generating unit 25 places the virtual object (X) at the position corresponding to the common marker 3Y based on information on the second-step combination corresponding to the first-step combination of the common marker 3Y and the individual marker 3A in combination information (S6 and S7 in FIG. 3).

When the feature detection unit 22 detects the common marker 3Y and the individual marker 3B, the image generating unit 25 places the virtual object (B) at the position corresponding to the common marker 3Y based on the first-step combination in combination information. If the individual marker 3A is then added and the feature detection unit 22 detects the common marker 3Y, the individual marker 3B, and the individual marker 3A, the image generating unit 25 places the virtual object (Y) at the position corresponding to the common marker 3Y based on information on the second-step combination corresponding to the first-step combination of the common marker 3Y and the individual marker 3B in combination information (S6 and S7 in FIG. 3).

By thus setting virtual objects according to the order of adding individual markers 3 combined with the common marker 3Y in combination information, a different virtual object will be displayed at the position corresponding to the common marker 3Y even for the same combination of the common marker 3Y, the individual marker 3A, and the individual marker 3B depending on the order in which the individual markers 3 are added, for example.

It is also possible to set virtual objects according to the positional relationship of the individual markers 3 with the common marker 3 in a case where a virtual object is made to correspond to a combination of the common marker 3Y and multiple individual markers 3 in combination information.

For example, for the combination of the common marker 3Y, the individual marker 3A, and the individual marker 3B in combination information, a virtual object (X) is made to correspond to the combination when the distance between the individual marker 3A and the common marker 3Y is shorter than the distance between the individual marker 3B and the common marker 3Y; while a virtual object (Y) is made to correspond to the combination when the distance between the individual marker 3A and the common marker 3Y is longer than the distance between the individual marker 3B and the common marker 3Y. In this case, when the feature detection unit 22 detects a sequence of the common marker 3Y, the individual marker 3A, and the individual marker 3B, for example, the image generating unit 25 places the virtual object (X) at the position corresponding to the common marker 3Y based on combination information (S6 and S7 in FIG. 3). If the individual marker 3A and the individual marker 3B are then interchanged in order, the feature detection unit 22 detects the sequence of the common marker 3Y, the individual marker 3B, and the individual marker 3A, and the image generating unit 25 places the virtual object (Y) at the position corresponding to the common marker 3Y based on combination information (S6 and S7 in FIG. 3).

By thus setting virtual objects according to the positional relationship of multiple individual markers 3 with the common marker 3Y in combination information, a different object will be displayed at the position corresponding to the common marker 3Y even for the same combination of the common marker 3Y, the individual marker 3A, and the individual marker 3B depending on the positional relationship of the respective individual markers 3 with the common marker 3Y, for example.

As described above, according to this embodiment, an AR function rich in variation and highly entertaining may be provided since the virtual object displayed at the position corresponding to the common marker 3Y varies depending on combination of the common marker 3Y and individual markers or the way of the combination.

According to the present disclosure, an augmented reality technique that is rich in visual variation can be provided.

Variations of the Embodiment

In the above-described embodiment, the display control unit 26 displays a composite image in which a virtual space image is superimposed on a captured image on a display device so that the user can see the virtual space image overlapping the real space. However, the display control unit 26 only has to display an image on the display device so that the user can see a virtual space image superimposed on the real space; the present disclosure is not limited to the scheme of displaying a composite image. For example, the present disclosure may also be applied to an augmented reality technique of a type that projects a virtual space image in the user's field of view so that the user can see the virtual space image superimposed on the real space, such as a HUD (head-up display) or the technique of projecting a virtual space image on goggles worn by the user.

While the above-described embodiment uses two individual markers 3, i.e., the individual markers 3A and 3B, the number of individual markers 3 is not limited to two, but two or more individual markers 3 may be used.

While the information processing apparatus 1 performs the above-described processing on a standalone basis in the aforementioned embodiment, this is not a limitation; the processing according to the above-described embodiment may be performed by multiple information processing apparatuses in a distributed manner. For example, combination information may reside in a database on a network so that the information processing apparatus 1 accesses the database to acquire combination information. As another example, processing by the image generating unit 25 may be designed to be executed by a server on a network so that the information processing apparatus 1 may send a result of detecting markers 3 to the server and the server may generate a virtual space image and send it to the information processing apparatus 1.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A system for implementing an augmented reality technique, comprising:
    a first feature in real space, wherein the first feature is of a plurality of feature types;
    a second feature in real space, wherein the second feature is of a type different from the plurality of feature types; and
    an information processing apparatus having at least one computer processor and having or connecting to a display device and an imaging device, the at least one computer processor configured to operate and perform functions as:
        an image acquiring unit that acquires an image of the real space captured by the imaging device;
        a feature detection unit that detects one or more features present in the acquired real space image;
        an image generating unit that places one or more virtual objects, which are made to correspond to each detected feature, at a position in a virtual space based on a position of each corresponding detected feature in the acquired real space image, and generates an image of the virtual space; and
        a display control unit that causes an image to be displayed on the display device such that a user sees the virtual space image superimposed upon the acquired real space image, wherein
        when a first feature and a second feature are detected in the real space image acquired by the image acquiring unit, the image generating unit determines a first virtual object made to correspond to a combination of the first feature and the second feature and places the first virtual object in the virtual space at a position in the virtual space based on a position of the second feature in the acquired real space image, and wherein the first virtual object is different from the one or more virtual objects made to correspond to each detected feature.

2. The information processing system according to claim 1, wherein when the first feature is detected with a second feature by the feature detection unit from a real space image acquired by the image acquiring unit, the image generating unit places both the first virtual object and a virtual object made to correspond to the detected second feature at a position in the generated virtual space image based on the position of the detected second feature in the acquired real space image.

3. The information processing system according to claim 1, wherein whenever the type of the first feature detected with the second feature by the feature detection unit is updated, the image generating unit updates the first virtual object to be placed at a position based on the position of the second feature to a first virtual object that corresponds to the type of the first feature after the update.

4. The information processing system according to claim 1, wherein whenever the type of the first feature detected with the second feature by the feature detection unit is updated, the image generating unit also places a first virtual object that corresponds to the type of the first feature after the update in addition to the first virtual object that has been displayed since before the update at a position based on the position of the second feature.

5. The information processing system according to claim 1, wherein whenever a plurality of first features and the second feature are detected by the feature detection unit in a real space image acquired by the image acquiring unit, the image generating unit places the first virtual objects respectively corresponding to the plurality of first features at a position based on the position of the second feature, and places virtual objects made to respectively correspond to the plurality of first features at respective positions that are based on the positions of the plurality of first features in the virtual space.

6. The information processing system according to claim 5, wherein whenever a plurality of the first features including features of different types and the second feature are detected by the feature detection unit in a real space image acquired by the image acquiring unit, the image generating unit places at least one of the first virtual objects corresponding to the types of the plurality of first features in the virtual space at a position based on the position of the second feature, and places virtual objects made to respectively correspond to the types of the plurality of first features at respective positions that are based on the positions of the plurality of first features.

7. The information processing system according to claim 5, wherein the image generating unit places the first virtual object that corresponds to the type of the first feature that satisfies a predetermined condition in the virtual space at a position based on the position of the second feature, and places virtual objects made to respectively correspond to the types of the plurality of first features at positions that are based on the positions of the plurality of first features.

8. The information processing system according to claim 7, wherein the image generating unit places the first virtual object that corresponds to the type of a first feature that is in a predetermined positional relationship with the second feature as the predetermined condition at a position based on the position of the second feature.

9. The information processing system according to claim 7, wherein the image generating unit places the first virtual object corresponding to the type of a first feature that has the highest priority, the priority being assigned to respective types of the first feature, among the first features detected by the feature detection unit as the predetermined condition at a position based on the position of the second feature.

10. The information processing system according to claim 1, wherein whenever a plurality of the first features of different types and the second feature are detected by the feature detection unit in a real space image acquired by the image acquiring unit, the image generating unit places the first virtual object that corresponds to a combination of the types of the plurality of first features in the virtual space at a position based on the position of the second feature, and places virtual objects made to respectively correspond to the types of the plurality of first features at respective positions that are based on the positions of the first features.

11. The information processing system according to claim 10, wherein the image generating unit places the first virtual object that corresponds to an order in which the plurality of first features of different types are added with respect to the second feature in the virtual space at a position based on the position of the second feature, and places virtual objects made to respectively correspond to the types of the plurality of first features at respective positions that are based on the positions of the first features.

12. The information processing system according to claim 10, wherein the image generating unit places the first virtual object that corresponds to respective positional relationships of the plurality of first features of different types with the second feature in the virtual space at a position based on the position of the second feature, and places virtual objects made to respectively correspond to the types of the plurality of first features at positions that are based on the positions of the first features.

13. The information processing system according to claim 1, wherein whenever the second feature is detected but the first feature has ceased to be detected by the feature detection unit while a virtual space image is being generated using the first virtual object corresponding to the first feature placed at a position based on the real space image position of the second feature in response to detection of the first feature and the second feature in the real space image acquired by the image acquiring unit, the image generating unit continues to generate the virtual space image and place the first virtual object corresponding to the first feature at a position in the generated virtual space image based on the position of the detected second feature in the acquired real space image.

14. The information processing system according to claim 13, wherein whenever a predetermined condition is satisfied, the image generating unit continues to generate the virtual space image even after the first feature ceases being detected, but without placing or displaying the first virtual object in the generated virtual space image.

15. The information processing system according to claim 14, wherein the predetermined condition is that a predetermined time period elapses since the first feature ceased to be detected.

16. The information processing system according to claim 1, wherein the first feature is graphics representing at least part of a figure of the virtual object made to correspond to the first feature, and the second feature is not graphics representing the figure of the virtual object made to correspond to the second feature.

17. The information processing system according to claim 1, wherein
the first feature is printed on an information holding device that holds information that enables a user to acquire a predetermined content and remains in the user's possession after the user acquired the predetermined content, and wherein
the second feature is printed on packaging of the information holding device.

18. An apparatus for implementing an augmented reality technique on a display device, comprising:
at least one computer processor connected to a display device and an imaging device, the computer processor configured to operate and perform functions as:
an image acquirer that acquires an image of a real space captured by an imaging device;

a feature detector that detects one or more features from the acquired real space image;

an image generator that generates an image of a virtual space and places one or more virtual objects, which are made to correspond to each detected feature, at a position in a virtual space based on a position of each corresponding detected feature in the acquired real space image; and a display controller that causes an image to be displayed on a display device such that a user sees the virtual space image superimposed upon the acquired real space image, wherein when a first feature and a second feature are detected in a real space image acquired by the image acquirer, the image generator determines a first virtual object corresponding made to correspond to a combination of the first feature and the second feature and places the first virtual object at a position in the virtual space based on a position of the second feature in the acquired real space image, wherein the first virtual object is different from the one or more virtual objects made to correspond to each detected feature, and wherein the first feature is of a plurality of feature types and the second feature is of a type different from the plurality of feature types.

19. An information processing method for providing an augmented reality technique implemented by a computer having at least one processor connected to a display device and an imaging device, the method comprising:

acquiring an image of a real space captured by an imaging device;

detecting one or more features from the acquired real space image;

generating an image of a virtual space and placing one or more virtual objects, which are made to correspond to each detected feature, at a position in a virtual space based on a position of each corresponding detected feature in the acquired real space image; and causing an image to be displayed on a display device such that a user sees the virtual space image superimposed upon the acquired real space image, wherein when a first feature and a second feature are detected in the acquired real space image, a first virtual object corresponding made to correspond to a combination of the first feature and the second feature is placed in the virtual space at a position based on the position of the second feature in the acquired real space image, wherein the first virtual object is different from the one or more virtual objects made to correspond to each detected feature, and wherein the first feature is of a plurality of feature types and the second feature is of a type different from the plurality of feature types.

20. A non-transitory computer-readable recording medium storing an information processing program for implementing an augmented reality technique which, when executed by a computer having at least one processor, a display device and an imaging device, causes the at least one processor to function and perform operations as:

an image acquiring unit that acquires an image of a real space captured by the imaging device;

a feature detection unit that detects one or more features in the acquired real space image;

an image generating unit that generates an image of a virtual space and places one or more virtual objects, which are made to correspond to each detected feature, at a position in a virtual space based on a position of each corresponding detected feature in the acquired real space image; and a display control unit that causes an image to be displayed on the display device such that a user sees the virtual space image superimposed upon the acquired real space image, wherein when a first feature and a second feature are detected in a real space image acquired by the image acquiring unit, the image generating unit determines a first virtual object corresponding made to correspond to a combination of the first feature and the second feature and places the first virtual object in the virtual space at a position in the virtual space based on a position of the second feature in the acquired real space image, wherein the first virtual object is different from the one or more virtual objects made to correspond to each detected feature, and wherein the first feature is of a plurality of feature types and the second feature is of a type different from the plurality of feature types.

21. A system for implementing an augmented reality technique, comprising:

a first feature of one or more items present in real space, wherein the first feature is of a plurality of feature types;

a second feature of another item in the real space, wherein the second feature is of a type different from the plurality of feature types; and an information processing apparatus having at least one computer processor and a display device and an input device, the at least one computer processor configured to operate and perform functions as:

an image acquiring unit that acquires an image of the real space captured by an the imaging device;

a feature detection unit that detects one or more features present in the acquired real space image;

an image generating unit that generates an image of a virtual space and places one or more virtual objects, which are made to correspond to each detected feature, at a position in a virtual space based on a position of each corresponding detected feature in the acquired real space image; and a display control unit that causes an image to be displayed on the display device such that a user sees the virtual space image superimposed a upon the acquired real space image, wherein when an item having a first feature and an item having a second feature are detected in a real space image acquired by the image acquiring unit, the image generating unit places both a first virtual object made to correspond to the detected second feature and a predetermined second virtual object at a position in the virtual space based on a position of the item having the second feature as detected in the acquired real space image, the second virtual object made to correspond to a particular combination of one or more items having a first feature and the item having the second feature, and wherein the first virtual object is different from the one or more virtual objects made to correspond to each detected feature.

* * * * *